US008754361B1

(12) United States Patent
Rafferty et al.

(10) Patent No.: US 8,754,361 B1

(45) Date of Patent: Jun. 17, 2014

(54) SYSTEMS AND METHODS FOR ADJUSTING A MASS SPECTROMETER OUTPUT

(71) Applicant: 1st Detect Corporation, Austin, TX (US)

(72) Inventors: David Rafferty, Webster, TX (US); Brian Oliver, League City, TX (US); Darron Black, Houston, TX (US)

( * ) Notice: Subject to any disclaimer, the term of this patent is extended or adjusted under 35 U.S.C. 154(b) by 0 days.

(21) Appl. No.: 13/794,751

(22) Filed: Mar. 11, 2013

(51) Int. Cl.
*G01D 18/00* (2006.01)
*G01N 30/72* (2006.01)

(52) U.S. Cl.
CPC .................................... *G01N 30/72* (2013.01)
USPC ................................................... 250/252.1

(58) Field of Classification Search
CPC ...... G01N 33/6848; G01N 30/72; H01J 49/26
USPC ................................................... 250/252.1
See application file for complete search history.

(56) References Cited

U.S. PATENT DOCUMENTS

| | | | | |
|---|---|---|---|---|
| 5,420,425 | A * | 5/1995 | Bier et al. | 250/292 |
| RE36,906 | E * | 10/2000 | Franzen et al. | 250/292 |
| 6,982,413 | B2 | 1/2006 | Knecht et al. | |
| 7,161,142 | B1 | 1/2007 | Patterson et al. | |
| 7,309,860 | B2 * | 12/2007 | Baba et al. | 250/288 |
| 7,589,320 | B2 * | 9/2009 | Baba et al. | 250/290 |
| 8,080,786 | B2 * | 12/2011 | Baba et al. | 250/290 |
| 2009/0294646 | A1 * | 12/2009 | Baba et al. | 250/282 |

* cited by examiner

*Primary Examiner* — Kiho Kim

(74) *Attorney, Agent, or Firm* — Finnegan, Henderson, Farabow, Garrett & Dunner LLP

(57) ABSTRACT

A mass spectrometer comprises an ion trap configured to trap ions and to eject ions. The ion trap comprises an electrode. The mass spectrometer further comprises a detector configured to detect ions ejected from the ion trap, a radio frequency (RF) generator electrically coupled to the electrode and configured to generate an RF signal, a sampling circuit electrically coupled to electrode and configured to measure a voltage of the RF signal at the electrode, and a signal processor electrically coupled to the sampling circuit and the detector. The signal processor is configured to receive outputs from the detector and the sampling circuit and to correct the output from the detector based on the output from the sampling circuit.

26 Claims, 10 Drawing Sheets

SYSTEMS AND METHODS FOR ADJUSTING A MASS SPECTROMETER OUTPUT

FIELD OF THE DISCLOSURE

The disclosure relates to mass spectrometers and, more particularly, systems and devices for adjusting an output of a mass spectrometers.

BACKGROUND OF THE DISCLOSURE

Mass spectrometry is a powerful technique used for chemical analysis, for example, for determining the chemical composition of a sample. One method of performing a mass spectrometric analysis includes the use of an ion trap, which dynamically traps ions from a sample using a time-varying electric field generated by electrodes that receive a time-varying signal, such as a radio frequency (RF) signal, from an electrical signal generation source. By gradually changing the characteristics of the time-varying signal, such as the signal's amplitude or frequency, the ions may be selectively ejected from the trap. This occurs because ions with certain mass/charge ratios will be ejected when the time-varying signal has certain amplitude and/or frequency characteristics.

Mass spectrometers may be very sensitive and may require regular tuning or calibration to maintain accuracy and sensitivity. For example, if a mass spectrometer is set to a detection range of 2,000 Daltons (Da) at a maximum RF voltage of 2 KV, then a 1/2,000 drift (0.05%) in the RF voltage would result in a 1 Da error in the measurement result. Such an error could lead to an identification of a wrong isotope or even a wrong compound. This would obviously be unacceptable. Therefore, for example, if an acceptable error is 0.1 Da, the drift in the RF voltage needs to be kept within 0.005%.

Therefore, there is a need for a mass spectrometer having an improved accuracy.

SUMMARY OF THE EMBODIMENTS

In accordance with the disclosure, there is provided a mass spectrometer. The mass spectrometer comprises an ion trap configured to trap and eject ions. The ion trap comprises an electrode. The mass spectrometer further comprises a detector configured to detect ions ejected from the ion trap, a radio frequency (RF) generator electrically coupled to the electrode and configured to generate an RF signal, a sampling circuit electrically coupled to the electrode and configured to measure a voltage of the RF signal at the electrode, and a signal processor electrically coupled to the sampling circuit and the detector. The signal processor is configured to receive outputs from the detector and the sampling circuit and to correct the output from the detector based on the output from the sampling circuit.

Also in accordance with the disclosure, there is provided a method for adjusting an output of a mass spectrometer. The method comprises generating a radio frequency (RF) signal to be applied to an electrode of an ion trap configured to trap ions, constructing a reference function describing a relationship at a reference time between a voltage of the RF signal and a parameter controlling the generation of the RF signal, and constructing a correction function based in part on the reference function, wherein the correction function describes a relationship between set values of the parameter at a time later than the reference time, and nominal values of the parameter at the reference time. The method further includes adjusting the output of the mass spectrometer based on the correction function.

Also in accordance with the disclosure, there is provided a non-transitory computer-readable medium storing a program, which, when executed by a computer, controls the computer to adjust an output of a mass spectrometer. The program controls the computer to construct a reference function describing a relationship at a reference time between a voltage of a radio frequency (RF) signal and a parameter controlling the generation of the voltage, wherein the RF signal is to be applied to an electrode of an ion trap configured to trap ions. The program also controls the computer to construct a correction function based on the reference function. The correction function describes a relationship between set values of the parameter at a time later than the reference time, and nominal values of the parameter at the reference time. The program further controls the computer to adjust the output of the mass spectrometer based on the correction function Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate certain embodiments of the present disclosure, and together with the description, serve to explain principles of the present disclosure.

DETAILED DESCRIPTION OF THE EMBODIMENTS

Reference will now be made in detail to the embodiments of the present disclosure described below and illustrated in the accompanying drawings. Wherever possible, the same reference numbers will be used throughout the drawings to refer to same or like parts.

Figure 1:
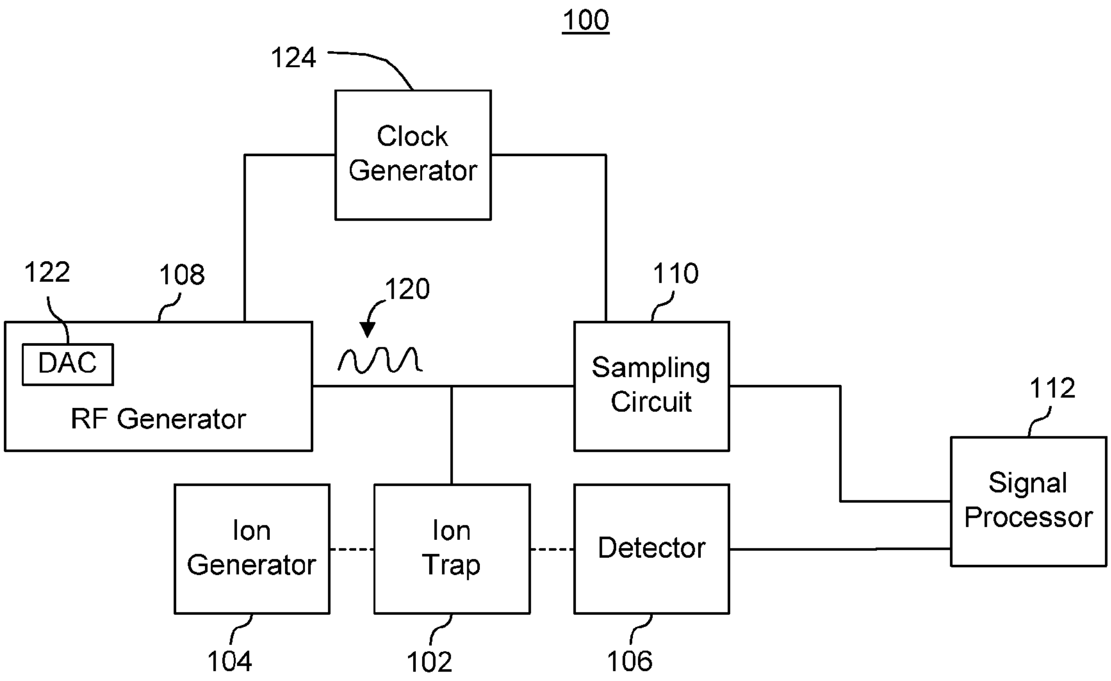
FIG. 1 is a block diagram schematically showing a mass spectrometer according to an exemplary embodiment.

FIG. 1 is a block diagram schematically showing a mass spectrometer 100 consistent with embodiments of the present disclosure. The mass spectrometer 100 includes an ion trap 102, an ion generator 104, an ion detector 106, an RF generator 108, a sampling circuit 110, and a signal processor 112.

The ion generator 104 is configured to generate ions from a sample. In the embodiment shown in FIG. 1, the ion generator 104 is formed separately from the ion trap 102. Thus, in such embodiments, the ion generator 104 also transports the generated ions to the ion trap 102. In some embodiments, the ion generator may be formed within the ion trap 102, and configured to generate ions within the ion trap 102. The ions generated from the sample may be of different kinds. For example, the ions may have different mass/charge ratios. The ions may be generated by, for example, electron ionization, electrospray ionization, thermal ionization, or chemical ionization.

The generated ions are trapped in the ion trap 102 by an electric field, such as a quadrupole trapping field, generated by electrodes of the ion trap 102 (the structure of the ion trap 102 will be described in more detail later). The electric field is controlled by an RF signal 120 generated by the RF generator 108 applied to at least one of the electrodes of the ion trap 102. In some embodiments, other electrical components may be connected between the ion trap 102 and the RF generator 108, such as, for example, a voltage transformer or a capacitor (not shown).

The characteristics of the RF signal 120 may vary with time. When a certain condition is satisfied (e.g., when the amplitude or frequency of the RF voltage signal 120 reaches a certain value), ions having a certain mass/charge ratio may be ejected from the ion trap 102. The voltage of the RF signal 120 may be controlled by controlling an output of the RF generator 108. For example, the RF signal 120 may have a frequency ranging from about 1 MHz to about 5 MHz. In some embodiments, the frequency of the RF signal 120 may be about 2.5 MHz to about 3.5 MHz. In some embodiments, a maximum peak-to-peak voltage of the RF signal 120 may be about 4 kV to about 5 kV. In some embodiments, a digital-to-analog converter (DAC) 122 is used to control the output of the RF generator 108 and thus to control the voltage of the RF signal 120. In FIG. 1, the DAC 122 is shown as a part of the RF generator 108. However, the DAC 122 may be a component independent of the RF generator 108.

The ions ejected from the ion trap 102 are detected by the ion detector 106. The ion detector 106 then outputs a signal to the signal processor 112. The signal processor 112 processes the signal output by the ion detector 106 and calibrate the output from the ion detector 106 according to methods consistent with embodiments of the present disclosure.

The sampling circuit 110 is electrically coupled to the RF generator 108 and the ion trap 102, and monitors the RF signal 120. An output of the sampling circuit 110, which may represent the voltage level of the RF signal 120, is also sent to the signal processor 112 and is used to correct or adjust the output from the ion detector 106, so as to off-set possible errors in the measurement results caused by, for example, the drift of the RF signal 120, where the drift may be caused by, for example, temperature, aging, and physical movement of the instrument. In some embodiment, the signal processor 112 may adjust a mass scale of a mass spectrum obtained using the output from the ion detector 106 directly (i.e., un-adjusted mass scale). For example, the signal processor 112 may construct a correction function based on the output from the sampling circuit 110 and adjust the output from the ion detector 106 based on the correction function, as will be described in more detail later.

As shown in FIG. 1, the mass spectrometer 100 further includes a clock generator 124, which provides clocks for both the RF generator 108 and the sampling circuit 110. Using the same clock generator 124 to derive frequencies for both the RF generator 108 and the sampling circuit 110 may eliminate relative drift between the frequency of the RF signal 120 and a frequency at which the sampling circuit 110 samples the RF signal 120, and thus the measurement accuracy may be improved. In some embodiments, the clock generator 124 is a single crystal oscillator.

Figure 2:
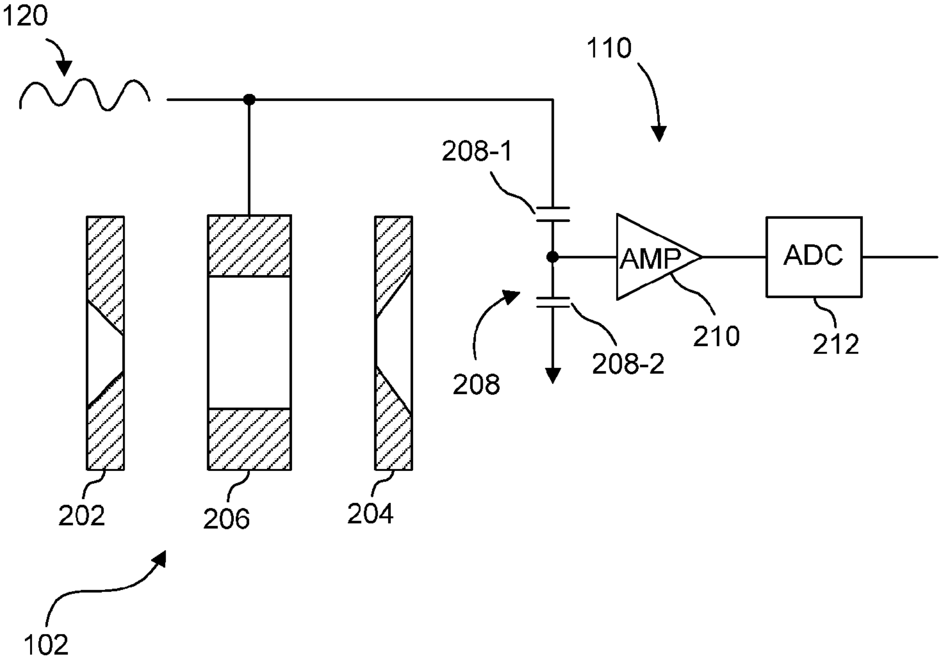
FIG. 2 shows an ion trap and a sampling circuit of the mass spectrometer shown in FIG. 1.

FIG. 2 shows in more detail a part of the mass spectrometer 100, including the ion trap 102 and the sampling circuit 110. Specifically, FIG. 2 shows a cross-sectional view of the electrodes of the ion trap 102 and a circuit diagram of the sampling circuit 110. As shown in FIG. 2, the ion trap 102 includes two end-cap electrodes 202 and 204, and one central electrode 206. Each of the two end-cap electrodes 202 and 204 has an aperture located, for example, at the center thereof, for allowing the ions or neutral molecules (which may be later ionized in the ion trap 102) to enter and leave the ion trap 102, respectively. In some embodiments, the central electrode 206 is a ring-shaped electrode surrounding a volume in which the ions are trapped. The central electrode 206 is electrically coupled to the RF generator 108 for receiving the RF signal 120.

The ion trap 102 shown in FIG. 2 includes a quadrupole ion trap with cylindrical geometry. However, this disclosure is not so limited. In some embodiments, the ion trap 102 may include a different type of ion trap, such as, for example, a linear ion trap. In such embodiments, the description below (including, for example, the sampling circuit, sampling methods, calibration methods, and measurement results correction methods) may also apply.

Consistent with embodiments of the present disclosure, the sampling circuit 110 includes a voltage divider 208, an amplifier 210, and an analog-to-digital converter (ADC) 212. As shown in FIG. 2, the voltage divider 208 comprises a first capacitor 208-1 electrically coupled to the RF generator 108 and a second capacitor 208-2 coupled to ground. A point between the first and second capacitors 208-1 and 208-2 is electrically coupled to an input end of the amplifier 210. An output end of the amplifier 210 is electrically coupled to an input end of the ADC 212.

In some embodiments, the first and second capacitors 208-1 and 208-2 are low drift capacitors, i.e., their capacitances are quite stable when an environmental condition, such as temperature, varies. In additional embodiments, the capacitors are chosen to have similar temperature drift characteristics. This is so that despite their values changing with temperature, the change is roughly proportional such that the ratio of the respective capacitor values remains constant. The second capacitor 208-2 may have a higher capacitance than the first capacitor 208-1. For example, the second capacitor 208-2 may be about 2,500 pf and the first capacitor 208-1 may be about 1 pf. Thus, in this example, a voltage at the input end of the amplifier 210 may be about 1/2,500 of the voltage of the RF signal 120. Other implementations consistent with the disclosed embodiments may use different capacitor values or implement the described voltage divider by using different types of circuitry.

Consistent with embodiments of the present disclosure, the amplifier 210 may provide a high impedance as seen by the voltage divider 208, such that the voltage at the input end of the amplifier 210 is mainly determined by the capacitances of the first and second capacitors 208-1 and 208-2. In addition, the amplifier 210 may provide a low impedance as seen by the ADC 212, so as to act as a strong drive source to the ADC 212.

The ADC 212 receives an output of the amplifier 210, which may be an analog signal, and converts it to a digital signal. Consistent with embodiments of the present disclosure, the resulting digital signal represents the level (or voltage) of the RF signal 120. For example, the resulting digital signal may be proportional to the level (or voltage) of the RF signal 120. The ADC 212 then outputs the resulting digital signal to the signal processor 112 via, for example, a serial peripheral interface. In some embodiments, the ADC 212 has a high bandwidth and a slow sampling rate. That is, the ADC 212 may work in an undersampling scheme, which is explained below in more detail.

Conventionally, to accurately measure the voltage of an RF signal, a sampling period (i.e., a time interval between two neighboring sampling points) needs to be much shorter than a period of the RF signal. A reconstructed waveform formed by connecting the sampling points may then be close to an actual waveform of the RF signal. However, when the period of the RF signal is short (i.e., the frequency of the RF signal is high), performing such a quick sampling is difficult.

Consistent with embodiments of the present disclosure, an undersampling is performed to measure the voltage of the RF signal 120. The sampling period $T_{sampling}$ is set to $(n/2+\Delta)T$, where n is a non-negative integer, T is the period of the RF signal 120, and $\Delta$ is a small offset. By referring to the phase of the RF signal 120, the actual phase of a sampling point may be written as $(j-1)(n/2+\Delta)\times 360°$ (assuming the first sampling point is at a phase of 0°), where j is a positive integer indicating the sampling point is the j-th sampling point. However, due to the periodicity, a result of a sampling performed at a phase of $i\times 360°+\phi$ (where i is a non-negative integer) would be the same as a result of a sampling performed at a phase of $\phi$, that is, the sampling performed at the phase of $i\times 360°+\phi$ would have an apparent phase of $\phi$.

Figure 3:
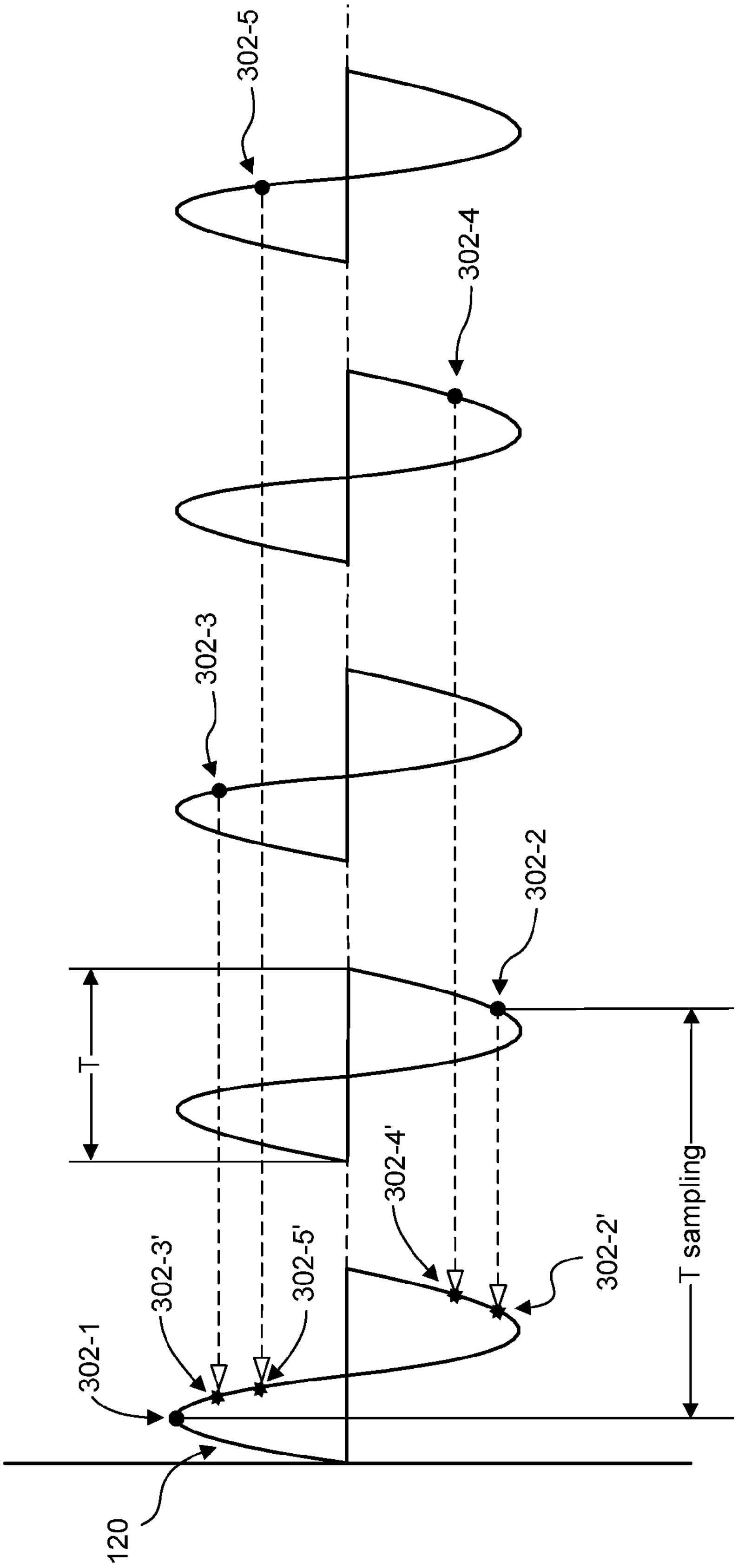
FIG. 3 schematically shows a waveform of a radio frequency (RF) signal and sampling of the RF signal.

Therefore, consistent with embodiments of the present disclosure, the actual phases of all sampling points may be "reflected back" into one period of the RF signal 120. This is schematically shown in FIG. 3, which shows a waveform of the RF signal 120 and sampling performed on the RF signal 120. As shown in FIG. 3, sampling is performed at sampling points 302-1, 302-2, 302-3, 302-4, 302-5, etc. The results of the sampling at sampling points other than 302-1 are "reflected back" to points 302-2', 302-3', 302-4', 302-5', etc. By connecting these "reflected-back" points, a reconstructed waveform close to one period of the waveform of the RF signal 120 may be obtained.

Consistent with embodiments of the present disclosure, the similarity between the reconstructed waveform and the waveform of the RF signal 120 may be controlled by the offset $\Delta$. The smaller the offset $\Delta$ is, the more data points may be obtained for forming the reconstructed waveform (i.e., the higher resolution). As a consequence, the similarity between the reconstructed waveform and the waveform of the RF signal 120 may be higher, and thus the measurement result of the voltage of the RF signal 120 may be more accurate. However, a smaller offset $\Delta$ may require a longer measurement time to obtain enough data points to form the reconstructed waveform. Due to drift, the waveform of the RF signal 120 in later periods may deviate from that in earlier periods. Thus, the measurement time may need to be controlled to be relatively short so that the deviation is not big enough to affect the measurement result. Therefore, the offset $\Delta$ may need to be chosen appropriately so as to balance the need for high-enough resolution and short-enough measurement time. For example, the offset $\Delta$ may be about 1/3000. To control the sampling circuit to sample at a smaller offset $\Delta$, a high-precision frequency generator may be employed.

Moreover, the sampling period $T_{sampling}$ may be mainly controlled by integer n. Larger integer n may result in longer measurement time. On the other hand, smaller integer n may require faster converting and processing, which may increase cost. Therefore, integer n may also need to be chosen appropriately so as to balance the need for shot-enough measurement time and low-enough cost. For example, integer n may equal to 9, 10, or 11.

Consistent with embodiments of the present disclosure, a same digital signal processor (DSP) (not shown) may be used to control the RF generator 108 and the ADC 212. As described above, the clock generator 124 (shown in FIG. 1) may be used to provide clocks for both the RF generator 108 and the sampling circuit 110. Thus, the ADC 212 is also controlled by a same clock as that for the RF generator. Using the same clock generator 124 to derive frequencies for the RF generator 108 and the ADC 212 may eliminate relative drift between the period of the RF signal T and the sampling period of the ADC 212 $T_{sampling}$. Therefore, measurement accuracy may be improved.

Calibration methods and measurement result correction methods consistent with embodiments of the present disclosure will be described below. Consistent with embodiments of the present disclosure, when certain conditions are satisfied, ions having certain mass will be ejected from the ion trap 102 and detected by the ion detector 106. Parameters that may determine when ions of certain mass are ejected include, for example, size of the ion trap 102 (e.g., radius of the electrode 206), frequency of the RF signal 120, and voltage of the RF signal 120. When other parameters are fixed, the mass of the ions being ejected can be written as a function of the voltage of the RF signal 120. Such a function may be a linear function:

$$M=aV, \tag{1}$$

where M is the mass of the ions being ejected, V is the voltage of the RF signal 120, and a is a coefficient. The influences of other factors, such as the radius of the electrode 206 and the frequency of the RF signal 120, are lumped into coefficient a.

It is seen from equation (1) that if coefficient a is determined, mass M can be calculated by substituting the value of voltage V into equation (1). However, during measurement, the voltage of the RF signal 120 is ramped up continuously by varying a control signal to the RF generator 108. Therefore, it may be difficult to measure the voltage of the RF signal 120 in real time, since such a measurement may require that the voltage of the RF signal 120 be kept constant for a certain period of time. One method may be, before actual measurements on samples, measuring the voltage of the RF signal 120 at multiple discrete values of the control signal, and then fitting the multiple discrete measurement results to obtain a function representing the relationship between the voltage of the RF signal 120 and the control signal.

For example, as discussed above, the output of the RF generator 108 may be controlled by controlling an output of the DAC 122. In some embodiments, the output of the DAC 122 may be represented by a percentage P of a maximum output of the DAC 122, where P (hereinafter, also referred to as DAC percentage P) may range from 0% to 100%. An N-point measurement may be performed to obtain the voltage V at each of N different DAC percentages (where N is an integer equal to or larger than 2), so as to obtain a set of data points $(V_1,P_1)$, . . . $(V_N, P_N)$. Then, a fitting method may be performed on these data points (hereinafter, such data points used for fitting or interpolation are also referred to as control points) to obtain a V-P function:

$$V=f(P). \quad (2)$$

Figure 4:
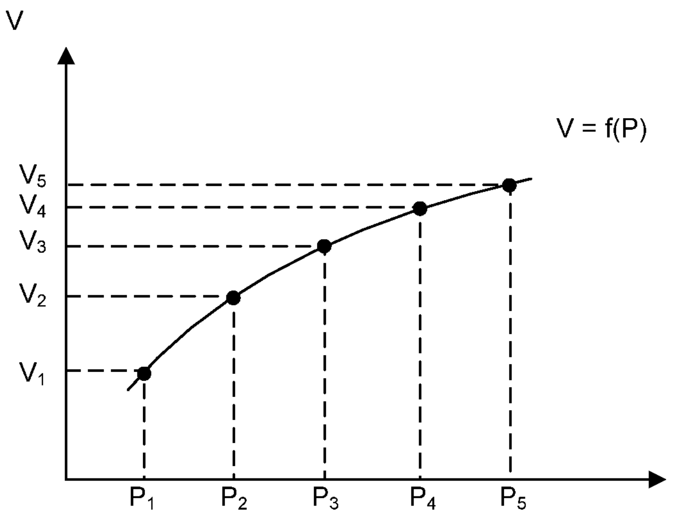
FIG. 4 is a graph schematically showing a V-P curve representing a relationship between a voltage of an RF signal and a setting of a digital-to-analog converter used in the RF generator generating the RF signal.

The fitting method may be, for example, a monotone cubic interpolation method, such as a monotone cubic interpolation method using a cubic Hermite spline function. The data points $(V_1, P_1), \ldots (V_N, P_N)$ and the curve representing the V-P function V=f(P) are schematically shown in FIG. 4. In FIG. 4, five data points are shown, that is, N=5. However, N may be a larger or smaller number, such as N=24. The larger N is, the more accurate the fitting result may be. However, if the N is too large, the time needed for measurement may be too long.

Figure 5:
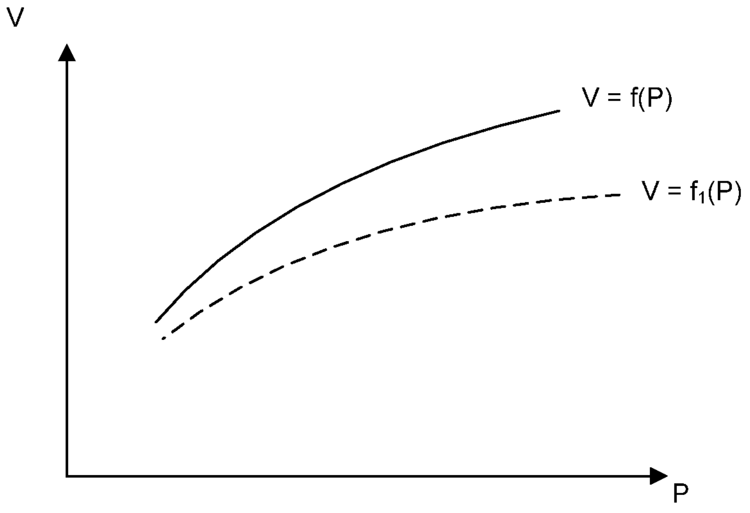
FIG. 5 is a graph schematically showing two V-P curves obtained at different times.

After the V-P function V=f(P) is obtained, if there is no drift, the voltage V can be determined directly by substituting the value of the percentage P into this function. However, due to the drift caused by, for example, temperature, aging, and physical movement of the instrument, the relationship between the voltage V and the percentage P may also change. For example, after a certain amount of time Δt, the relationship between V and P may shift to $V=f_1(P)$, as schematically shown in FIG. 5 (the dashed curve). At that time, if V=f(P) is still used to calculate the voltage V, the measurement results may not be accurate. However, it may also be practically difficult to obtain a new relationship between V and P before every RF ramp, or before every small number of RF ramps, performed for a sample measurement. This may be time consuming and thus may reduce the efficiency of the RF measurement.

Figure 6:
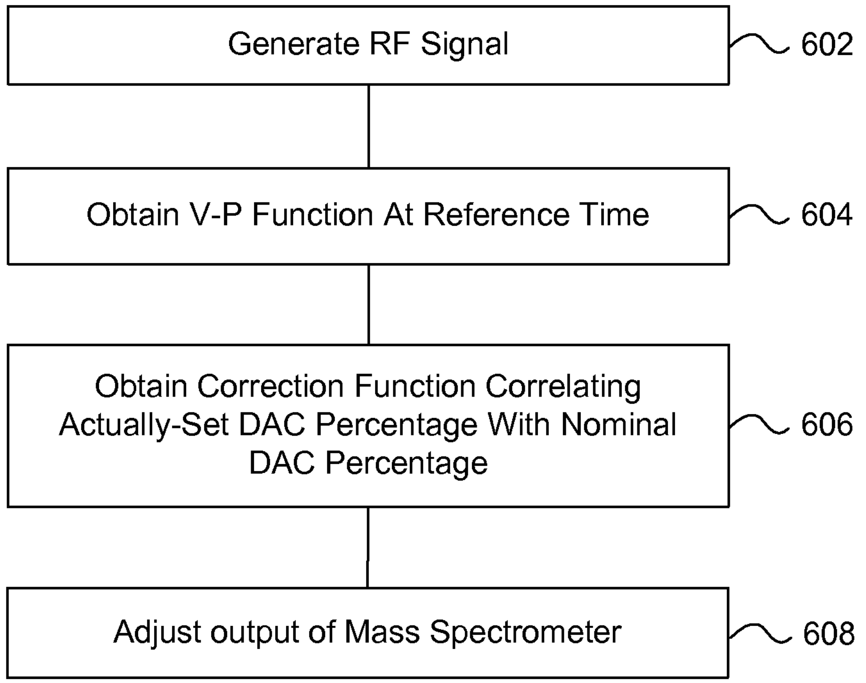
FIG. 6 is a flow chart showing a method according to an exemplary embodiment for calibrating an output of a mass spectrometer.

FIG. 6 is a process flow schematically showing a method consistent with embodiments of the present disclosure for calibrating an output of a mass spectrometer, such as the mass spectrometer 100. As shown in FIG. 6, at 602, the RF signal 120 to be applied to the electrode 206 is generate. At 604, a V-P function V=f(P) is obtained as a reference function, which describes a relationship between the voltage V of the RF signal 120 and the DAC percentage P at a reference time $t_{ref}$. (Note the data points for calculating this V-P function V=f(P) are not taken at an exact same instance of time, but over a period of time; however, that period of time is short and it may be assumed that there is no or little drift during that period of time.) The reference time $t_{ref}$ may be a time before the measurement of a sample (either a calibration sample or a measurement sample) is performed. The V-P function V=f(P) may be obtained by, for example, a method described earlier in this disclosure.

At 606, a correction function is obtained, which correlates an actually-set DAC percentage $P_{set}$, at a time $t_{set}$ after the reference time $t_{ref}$, with a nominal DAC percentage $P_{nom}$. The time $t_{set}$ after the reference time $t_{ref}$ may be a time during the measurement of the sample, e.g., during an RF ramp, or a time between two RF ramps. The nominal DAC percentage $P_{nom}$ is a DAC percentage at the reference time $t_{ref}$ that may produce a voltage V that is about the same as or close to the voltage of the RF signal 120 with an actually-set DAC percentage $P_{set}$ at time $t_{set}$. Consistent with embodiments of the present disclosure, the correction function may be dynamically generated during a sample measurement. Using this correction function, all actually-set DAC percentages at different times may be "referenced back" (or "corrected back") to their corresponding nominal DAC percentages at a same earlier time, i.e., the reference time $t_{ref}$. Therefore, the correction function may compensate for the drift occurred during the generation of the RF signal 120.

At 608, the mass spectrometer 100 is calibrated based on the correction function and, in some embodiments, the reference function.

Figure 7:
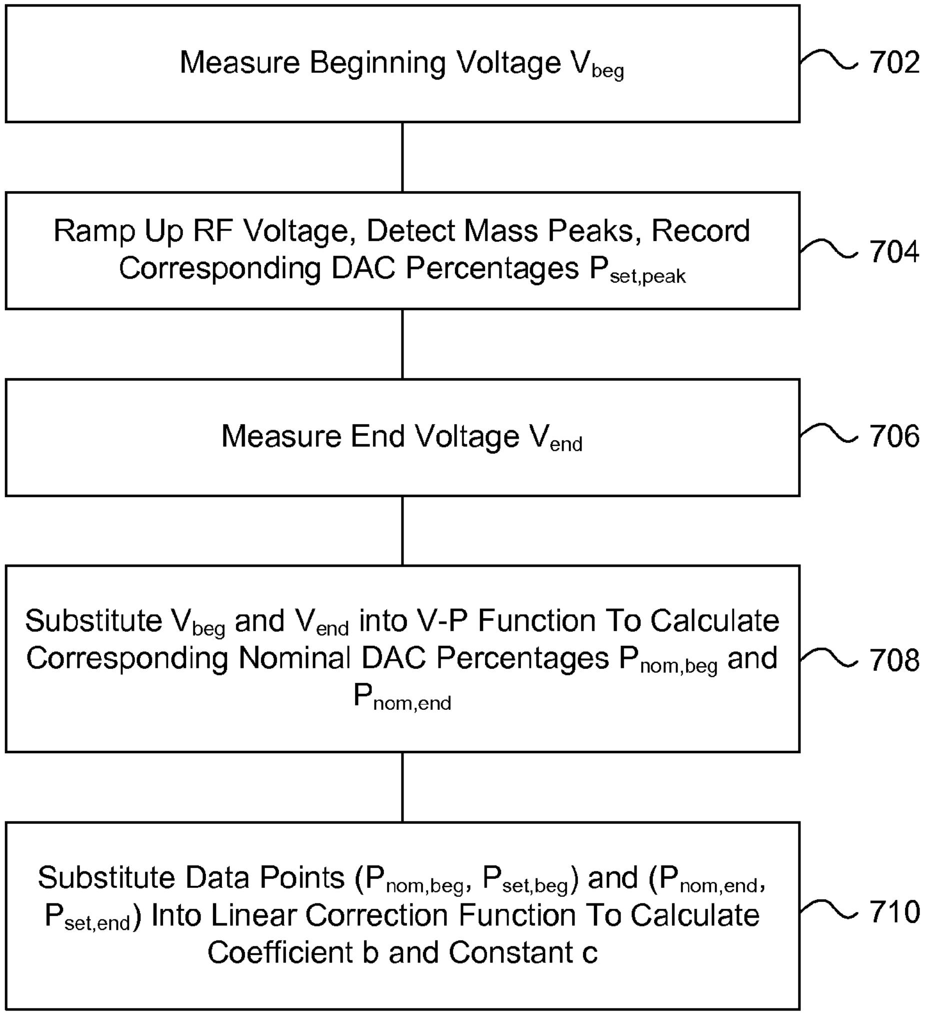
FIG. 7 is a flow chart showing a method according to an exemplary embodiment for estimating a linear correction curve.

In some embodiments, the correction function obtained at 606 of FIG. 6 may be a linear function $$P_{nom}=bP_{set}+C, \quad (3)$$

where b is a coefficient and c is a constant. FIG. 7 is a process flow schematically showing a method consistent with embodiments of the present disclosure for estimating the linear correction function, i.e., equation (3). Before an RF ramp for sample measurement, the voltage of the RF signal 120 is set to an RF ramp beginning voltage $V_{beg}$, by setting the DAC percentage to a beginning DAC percentage $P_{set,beg}$. The DAC percentage is kept at $P_{set,beg}$ for a period of time of, for example, about 3 milliseconds (ms) to about 15 ms before the RF ramp begins. During that period of time, $V_{beg}$ is measured by the sampling circuit 110. See 702 in FIG. 7.

At 704, the voltage of the RF signal 120 is ramped up, by ramping up the DAC percentage. The sample measurement is performed during this RF ramp. That is, ions generated from a sample are transferred into or created in the ion trap 102 and sequentially ejected from the ion trap 102 during this RF ramp. Therefore, mass peaks may be detected by the detector 106. The actually-set DAC percentage $P_{set,peak}$ at which a mass peak is detected is recorded.

At 706, after the RF ramp is finished, the DAC percentage is kept at an end DAC percentage $P_{set,end}$ (and thus the voltage of the RF signal 120 kept at a corresponding end voltage $V_{end}$), for a period of time of, for example, about 3 ms to about 15 ms, during which $V_{end}$ is measured by the sampling circuit 110. The end DAC percentage $P_{set,end}$ may be the same as or different from the DAC percentage at the last point of the RF ramp.

At 708, $V_{beg}$ and $V_{end}$ are plugged into the V-P function V=f(P), respectively, to calculate corresponding nominal DAC percentages $P_{nom,beg}$ and $P_{nom,end}$, respectively.

Figure 8:
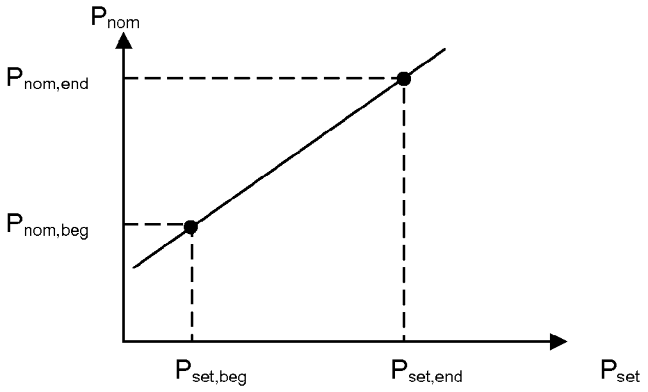
FIG. 8 is a graph schematically showing a linear correction curve obtained using the method shown in FIG. 7.

At 710, data points $(P_{nom,beg}, P_{set,beg})$ and $(P_{nom,end}, P_{set,end})$ are substituted into equation (3) to calculate the coefficient b and the constant c. As a result, the linear correction function $P_{nom}=bP_{set}+c$ is obtained. FIG. 8 schematically shows a curve representing this linear correction function. Data points $(P_{nom,beg}, P_{set,beg})$ and $(P_{nom,end}, P_{set,end})$ are also shown in FIG. 8.

Consistent with embodiments of the present disclosure, the process shown in FIG. 7 may be repeated each time an RF ramp is performed, and therefore providing a "real-time" correction function for referencing (or correcting) an actually-set DAC percentage $P_{set}$ at the time $t_{set}$ "back" to a nominal DAC percentage $P_{nom}$ at the time $t_{ref}$. Alternatively, the correction function may be generated every several RF ramps, i.e., a same correction function may be used for several RF ramps.

Since only two voltage measurements are performed each time a correction function is constructed, time required for voltage measurement is reduced as compared to the situation where a V-P function V=f(P) is generated each time before an RF ramp. Moreover, since the voltage measurements are performed before the beginning and after the end of an RF ramp, the RF ramp is not disturbed.

Figure 9:
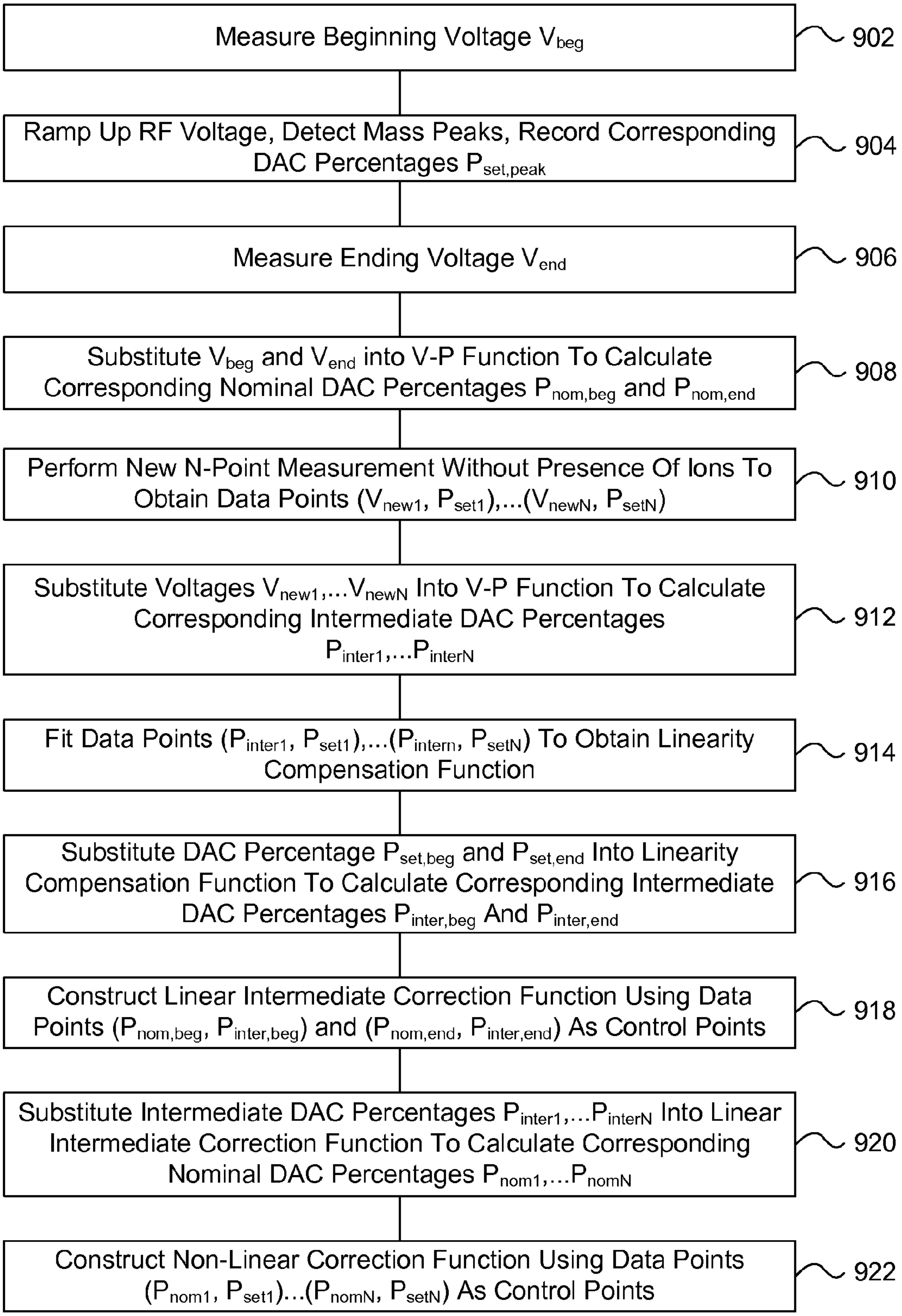
FIG. 9 is a flow chart showing a method according to an exemplary embodiment for estimating a non-linear correction curve.
Figure 10A:
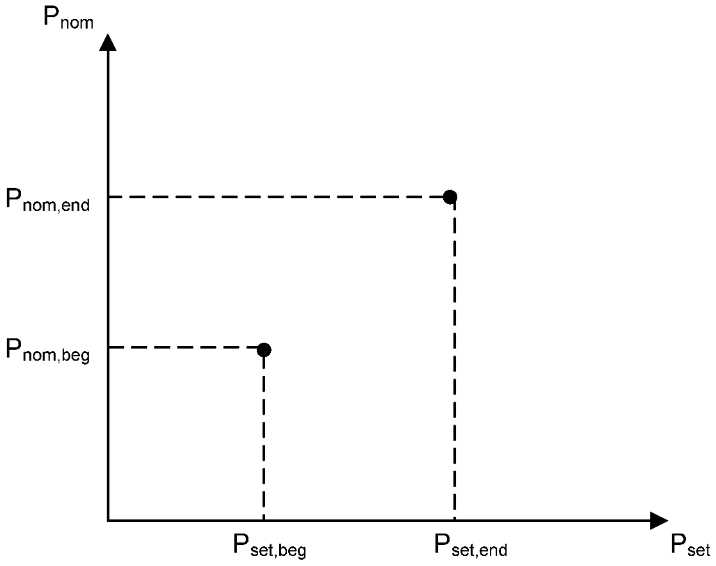
FIGS. 10(A)-10(E) are graphs schematically showing the results obtained during the process shown in FIG. 9.

In the method shown in FIG. 7 and described above, the correction function is assumed to be a linear function. In some embodiments, a non-linear correction function $$P_{nom}=g(P_{set}) \quad (4)$$

may provide a higher accuracy. FIG. 9 is a process flow schematically showing a method consistent with embodiments of the present disclosure for estimating the non-linear correction function, i.e., equation (4). 902, 904, 906, and 908 in FIG. 9 are similar to 702, 704, 706, and 708 in FIG. 7, and thus their explanation is not repeated. After 908, two data points ($P_{nom,beg}$, $P_{set,beg}$) and ($P_{nom,end}$, $P_{set,end}$) are obtained, similar to the results in FIG. 7 after 708. The two data points ($P_{nom,beg}$, $P_{set,beg}$) and ($P_{nom,end}$, $P_{set,end}$) are schematically shown in FIG. 10(A). It is noted that, since equation (4) is a non-linear function, having only these two data points may not be enough to construct equation (4). Therefore, further data points are needed.

Figure 10B:
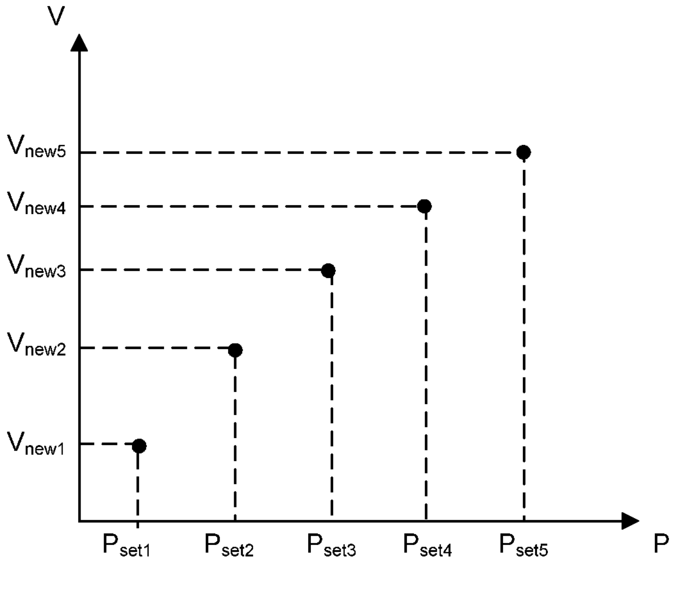

At 910, a new N-point measurement is performed without the presence of ions. A set of data points ($V_{new1}$, $P_{set1}$), . . . ($V_{newN}$, $P_{setN}$) are obtained. In some embodiments, the values of $P_{set1}$, . . . $P_{setN}$ may be set to be the same as those of $P_1$, . . . $P_N$, respectively, which are used in 902 (see 702 in FIG. 7) for estimating the V-P function V=f(P). In such a situation, the set of data points ($V_{new1}$, $P_{set1}$), . . . ($V_{newN}$, $P_{setN}$) may also be written as ($V_{new1}$, $P_1$), . . . ($V_{newN}$, $P_N$). FIG. 10(B) schematically shows these data points in a V-P graph. In FIG. 10(B), five data points are shown, that is, N=5. However, N may be a larger or smaller number, such as 24.

At 912, the values of voltages $V_{new1}$, . . . $V_{newN}$ are substituted into the V-P function V=f(P) (i.e., equation (2)), respectively, to calculate corresponding intermediate DAC percentages $P_{inter1}$, . . . $P_{interN}$.

At 914, a fitting method is performed on the set of data points ($P_{inter1}$, $P_{set1}$), . . . ($P_{interN}$, $P_{setN}$) to obtain a linearity compensation function:

$$P_{inter}=h(P_{set}). \quad (5)$$

Figure 10C:
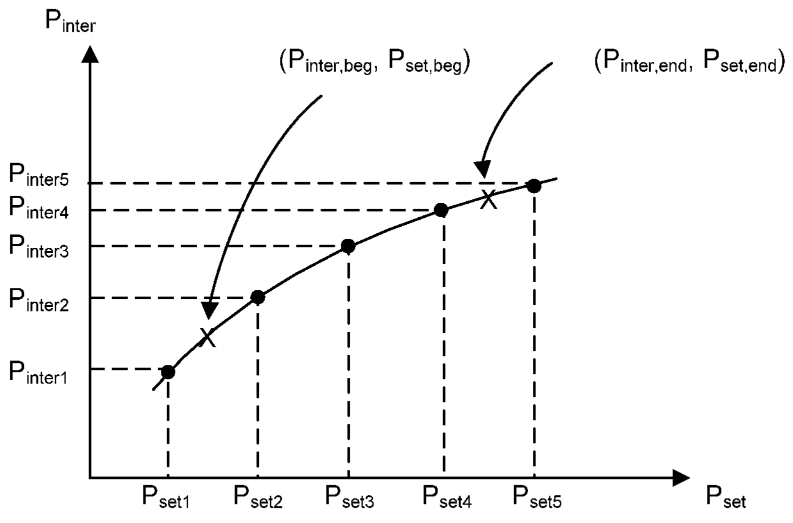

This linearity compensation function correlates an actually-set DAC percentage to an intermediate DAC percentage, which will be further processed to obtain the corresponding nominal DAC percentage. FIG. 10(C) schematically shows a curve representing the linearity compensation function and the data points ($P_{inter1}$, $P_{set1}$), . . . ($P_{interN}$, $P_{setN}$).

At 916, the DAC percentage before the beginning and after the end of the RF ramp, i.e., $P_{set,beg}$ and $P_{set,end}$, are substituted into the right side of the linearity compensation function (i.e., equation (5)), to calculate the corresponding intermediate DAC percentages $P_{inter,beg}$ and $P_{inter,end}$, respectively. The two data points ($P_{inter,beg}$, $P_{set,beg}$) and ($P_{inter,end}$, $P_{set,end}$) are also marked in FIG. 10(C).

Figure 10D:
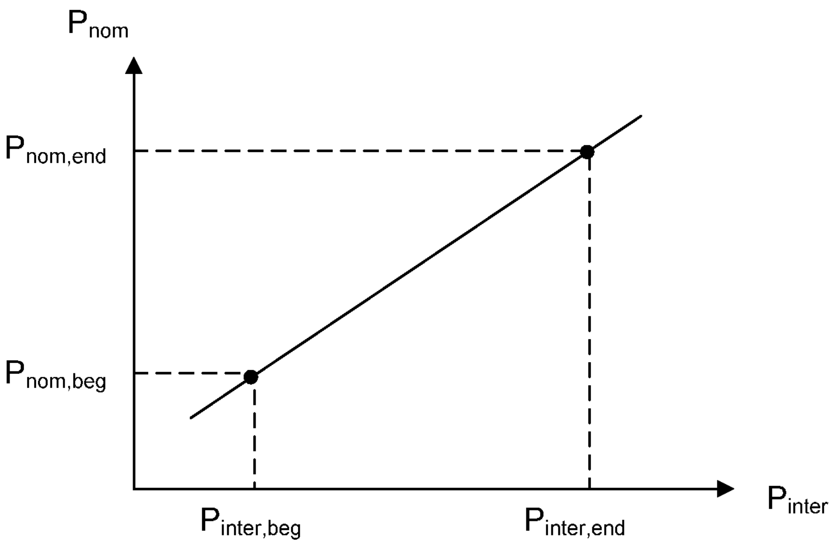

At 918, a linear intermediate correction function $$P_{nom}=b'P_{inter}+c' \quad (6)$$

is constructed using data points ($P_{nom,beg}$, $P_{inter,beg}$) and ($P_{nom,end}$, $P_{inter,end}$) as control points. FIG. 10(D) schematically shows the linear intermediate correction function and the two data points ($P_{nom,beg}$, $P_{inter,beg}$) and ($P_{nom,end}$, $P_{inter,end}$).

At 920, intermediate DAC percentages $P_{inter1}$, . . . $P_{interN}$ are substituted into the right side of the linear intermediate correction function (i.e., equation (6)) to calculate corresponding nominal DAC percentages $P_{nom1}$, . . . $P_{nomN}$.

Figure 10E:
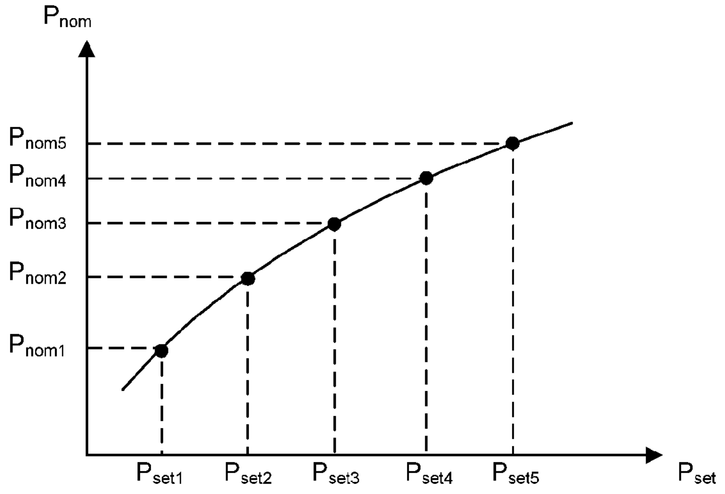

At 922, data points ($P_{nom1}$, $P_{set1}$), . . . ($P_{nomN}$, $P_{setN}$) are used to construct the non-linear correction function $P_{nom}$=g($P_{set}$) (i.e., equation (4)). The constructed non-linear correction function is schematically shown in FIG. 10(E). FIG. 10(E) also shows the data points ($P_{nom1}$, $P_{set1}$), . . . ($P_{nomN}$, $P_{setN}$).

Consistent with embodiments of the present disclosure, the process shown in FIG. 9, except 910, 912, and 914, may be repeated each time an RF ramp is performed, or may be repeated every several RF ramps. 910, 912, and 914 may be performed less frequently than other steps in the process of FIG. 9, i.e., a same linearity compensation function (i.e., equation (5)) may be repeatedly used every time the process of FIG. 9 is performed, before a next linearity compensation function (i.e., equation (5)) is generated.

In each of the processes shown in FIGS. 7 and 9, the nominal DAC percentages $P_{nom,beg}$ and $P_{nom,end}$ corresponding to $P_{set,beg}$ and $P_{set,end}$ are used for the rest of the process. Consistent with embodiments of the present disclosure, $P_{nom,beg}$ and $P_{nom,end}$ may be further scaled, and the scaled nominal DAC percentages $P_{scaled\_nom,beg}$ and $P_{scaled\_nom,end}$, instead of $P_{nom,beg}$ and $P_{nom,end}$, are used for the rest of the process. The scaled nominal DAC percentage $P_{scaled\_nom,beg}$ may be calculated by, for example, $$P_{scaled\_nom,beg}=P_{set,beg}+d\times(P_{nom,beg}-P_{set,beg}), \quad (7)$$

where d is a scaling factor having a value, for example, between about 1 and about 1.2. The scaled nominal DAC percentage $P_{scaled\_nom,end}$ may be calculated using a similar equation.

Consistent with embodiments of the present disclosure, the voltage $V_{peak}$ at which a mass peak is detected may be estimated by substituting the actually-set DAC percentage $P_{set,peak}$, at which the mass peak is detected, into either the linear correction function (i.e., equation (3)) or the non-linear correction function (i.e., equation (4)) to calculate a corresponding nominal DAC percentage $P_{nom,peak}$ and substituting the calculated nominal DAC percentage $P_{nom,peak}$ into equation (2). Further, by substituting the estimated voltage $V_{peak}$ into equation (1), the mass M of the ions that cause the mass peak can be obtained (determination of the coefficient a in equation (1) will be described later).

Figure 11:
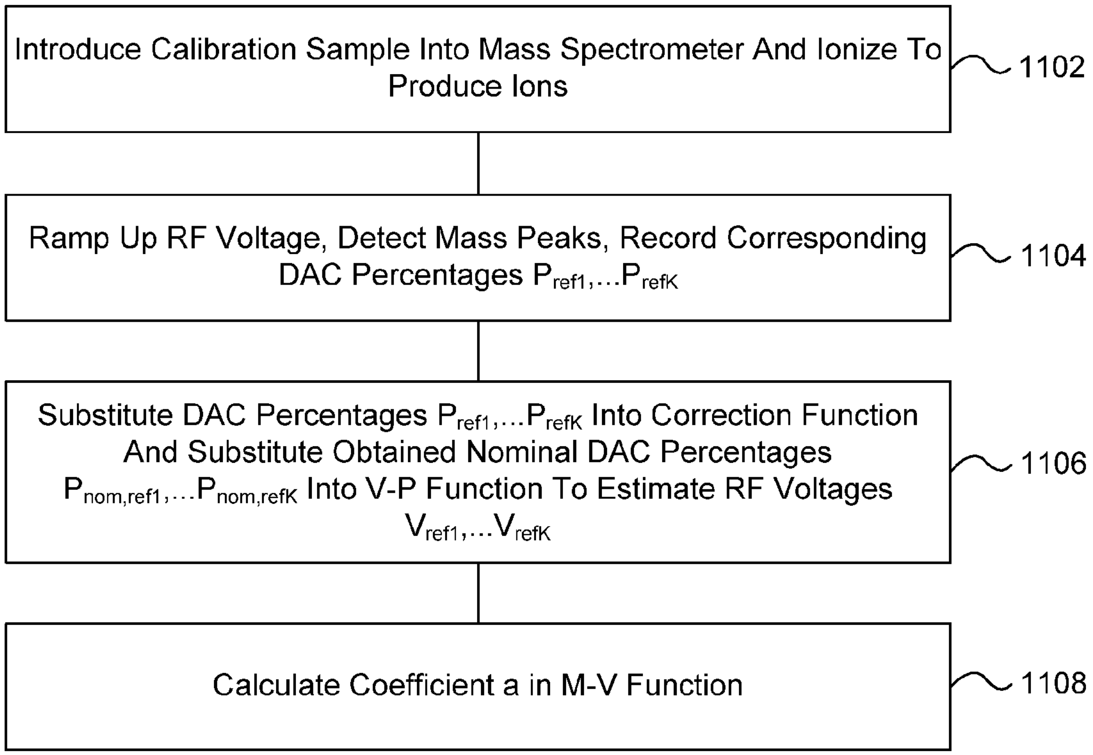
FIG. 11 is a flow chart showing a method according to an exemplary embodiment for estimating the relationship between ion mass and RF voltage.

FIG. 11 is a process flow showing a calibration method consistent with embodiments of the present disclosure, which is performed to calculate coefficient a in equation (1). Consistent with embodiments of the present disclosure, in the process shown in FIG. 11, while mass peaks are detected, a correction function may be constructed contemporaneously (according to the process shown in FIG. 6), which may then be used for estimating RF voltages corresponding to the detected mass peaks.

At 1102, a calibration sample is introduced into the mass spectrometer 100 and ionized to produce K (K is an integer) kinds of ions (hereinafter referred to as calibration ions). In some embodiments, the calibration sample may be, for example, perfluortributylamine (PFTBA) or perfluorhexane (PFH). These calibration ions have known peaks on a mass spectrum, that is, the K kinds of calibration ions have known masses of $M_{ref1}$, . . . $M_{refK}$, respectively. Before the calibration ions are transferred to, or created in, the ion trap 102, a V-P function may have been obtained as a reference function that describes the relationship between the RF voltage and the DAC percentage at a reference time $t_{ref}$ (according to 604 in FIG. 6). The reference time $t_{ref}$ may be a time before or after the calibration sample is introduced into the mass spectrometer. After the calibration ions are transferred to or created in the ion trap 102, they are trapped in the ion trap 102. At this stage, the voltage of the RF signal 120 is kept at a constant value, such as a beginning voltage $V_{beg}$, by controlling the DAC percentage to be a constant value, such as a beginning DAC percentage $P_{set,beg}$.

At 1104, the voltage of the RF signal 120 is ramped up by controlling the DAC percentage to increase with time, such that the calibration ions of different kinds are ejected from the ion trap 102 and detected by the detector 106 sequentially. After the RF ramp is finished, the DAC percentage is kept at an end DAC percentage $P_{set,end}$ (and thus the voltage of the RF signal 120 kept at an end voltage $V_{end}$). In some embodiments, the DAC percentage is controlled to increase linearly with time. The DAC percentages at which mass peaks are detected are recorded as $P_{ref1}, \ldots P_{refK}$.

While the voltage is ramped up, the correction function may be constructed (according to 606 in FIG. 6), which may be used to reference an actually-set DAC percentage back to a nominal DAC percentage at the reference time $t_{ref}$. The correction function may be a linear correction function obtained according to the process shown in FIG. 7, or a non-linear correction function obtained according to the process shown in FIG. 9.

At 1106, the voltages of the RF signal 120, $V_{ref1}, \ldots V_{refK}$, at which the K kinds of calibration ions are ejected are estimated by substituting the DAC percentages $P_{ref1}, \ldots P_{refK}$ into the correction function and then substituting the obtained nominal DAC percentages $P_{nom,ref1}, \ldots, P_{nom,refK}$ into the V-P function (i.e., equation (1)).

At 1108, the value of coefficient a in equation (1) is calculated using the estimated voltages $V_{ref1}, \ldots V_{refK}$ and corresponding ion masses $M_{ref1}, \ldots M_{refK}$. In some embodiments, each pair of $(V_{ref1}, M_{ref1}), \ldots (V_{refK}, M_{refK})$ is plugged into equation (1) to obtain $a_1, \ldots a_N$, which are then averaged to give the value of coefficient a. In some embodiments, a linear regression method, such as a least-squares method, is used to find out the value of coefficient a based on the estimated voltages $V_{ref1}, \ldots V_{refK}$ and corresponding masses $M_{ref1}, \ldots M_{refK}$.

After coefficient a is determined, equation (1) can be used during a measurement to calculate masses of ions generated from a measurement sample, based on corresponding voltages of the RF signal 120 estimated consistent with, e.g., the process shown in FIG. 6. The detailed process for measuring ion masses of a measurement sample is similar to that of a calibration process for calculating coefficient a, except that when measuring ion masses, the coefficient a is known and the ion masses are found by substituting estimated voltages into equation (1).

In the embodiments described above, voltages are estimated and then substituted into equation (1) to calculate corresponding ion masses. In such an approach, it is assumed that coefficient a is relatively stable. In some other embodiments, the contribution of coefficient a may also be considered.

Figure 12:
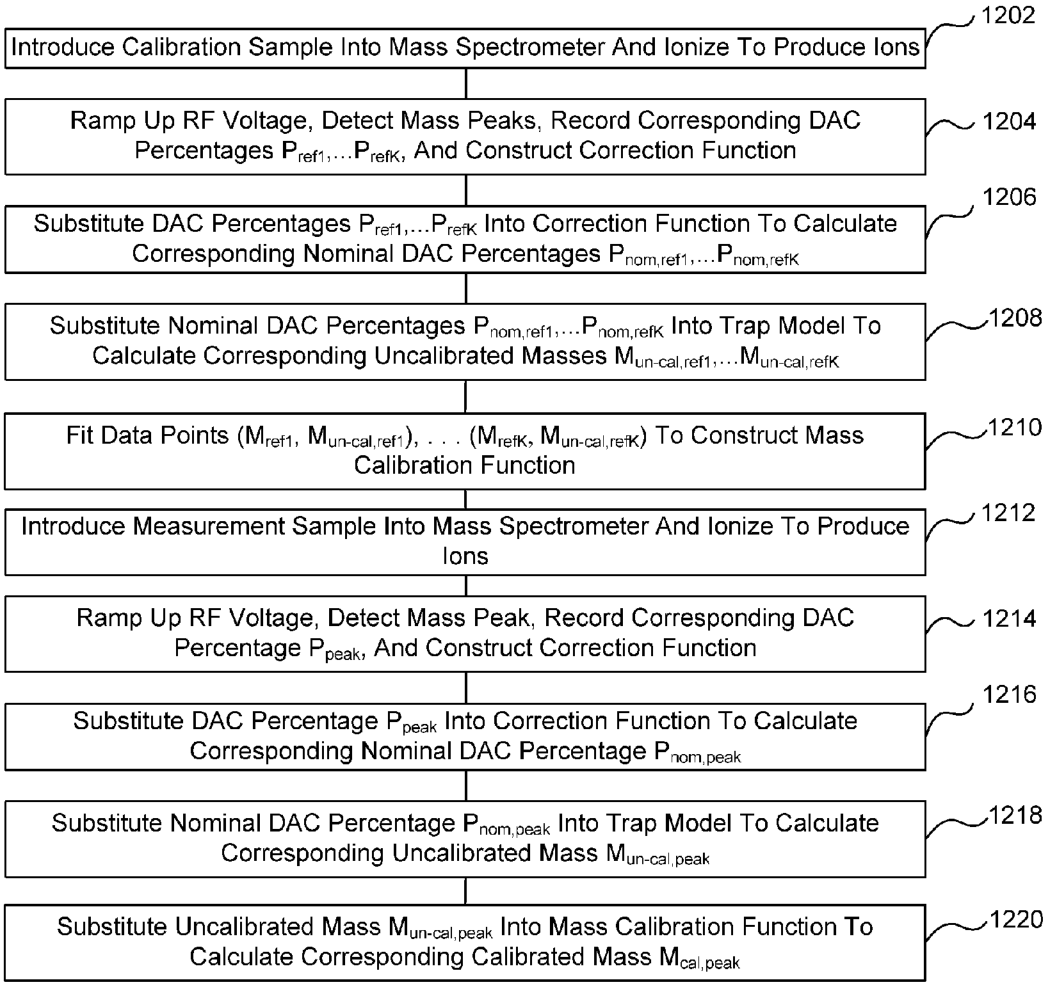
FIG. 12 is a flow chart showing a method according to an exemplary embodiment for correcting a measurement result of an mass spectrometer.

FIG. 12 is a process flow showing another exemplary method consistent with embodiments of the present disclosure, for correcting a measurement results of a mass spectrometer. In the method shown in FIG. 12, an equation-based trap model $$M=f(P) \tag{8}$$

is used. This trap model relates an ion mass M to a corresponding DAC percentage P set in the DAC 122. In some embodiments, the trap model may be an analytical model constructed based on the theory of mass spectrometer, and may take into consideration factors such as, for example, the ramp settings and the RF frequency. By substituting the DAC percentage into equation (8), a theoretically-calculated ion mass may be obtained. This theoretically-calculated ion mass may differ from the actual ion mass, and may be adjusted using, for example, the method shown in FIG. 12.

As shown in FIG. 12, at 1202, a calibration sample is introduced into the mass spectrometer 100 and ionized to produce K (K is an integer) kinds of calibration ions. This is similar to 1102 in FIG. 11. The calibration ions thus generated have known peaks on a mass spectrum, that is, the K kinds of calibration ions have known masses of $M_{ref1}, \ldots M_{refK}$, respectively. Before the calibration ions are transferred to or created in the ion trap 102, a V-P function may have been obtained as a reference function that describes the relationship between the RF voltage and the DAC percentage at a reference time $t_{ref}$ (according to 604 in FIG. 6). The reference time $t_{ref}$ may be a time before or after the calibration sample is introduced into the mass spectrometer. After the calibration ions are transferred to or created in the ion trap 102, they are trapped in the ion trap 102. At this stage, the voltage of the RF signal 120 is kept at a constant value, such as a beginning voltage $V_{beg}$, by controlling the DAC percentage to be a constant value, such as a beginning DAC percentage $P_{set,beg}$.

At 1204, the voltage of the RF signal 120 is ramped up by controlling the DAC percentage to increase with time, such that the calibration ions of different kinds are ejected from the ion trap 102 and detected by the detector 106 sequentially. After the RF ramp is finished, the DAC percentage may be kept at an end DAC percentage $P_{set,end}$ (and such the voltage of the RF signal 120 is kept at an end voltage $V_{end}$). In some embodiments, the DAC percentage is controlled to increase linearly with time. The DAC percentages at which mass peaks are detected are recorded as $P_{ref1}, \ldots P_{refK}$. This is also similar to 1104 in FIG. 11.

While the voltage is ramped up, a correction function may be obtained (according to 606 in FIG. 6), which may be used to reference an actually-set DAC percentage back to a nominal DAC percentage at the reference time $t_{ref}$. The correction function may be a linear correction function obtained according to the process shown in FIG. 7, or a non-linear correction function obtained according to the process shown in FIG. 9.

At 1206, the DAC percentages $P_{ref1}, \ldots P_{refK}$ are substituted into the correction function obtained at 1204 to calculate corresponding nominal DAC percentages $P_{nom,ref1}, \ldots P_{nom,refK}$.

At 1208, the calculated nominal DAC percentages $P_{nom,ref1}, \ldots P_{nom,refK}$ are substituted into the trap model (i.e., equation (8)) to calculate corresponding ion masses. These calculated ion masses are uncalibrated ion masses, and are recorded as $M_{un\text{-}cal,ref1}, \ldots M_{un\text{-}cal,refK}$.

At 1210, fitting is performed on data points $(M_{ref1}, M_{un\text{-}cal,ref1}), \ldots (M_{refK}, M_{un\text{-}cal,refK})$ to construct a mass calibration function:

$$M_{cal}=f(M_{un\text{-}cal}), \tag{9}$$

where $M_{un\text{-}cal}$ is M an un-calibrated mass obtained by substituting a nominal DAC percentage into the trap model (i.e., equation (8)). The mass calibration function can then be used during the measurement of a measurement sample to calibrate the ion mass, as further described below.

At 1212, a measurement sample is introduced into the mass spectrometer 100 and ionized to produce ions. After the ions are transferred to or created in the ion trap 102, they are trapped in the ion trap 102. At this stage, the voltage of the RF signal 120 is kept at a constant value, such as a beginning voltage $V_{beg'}$, by controlling the DAC percentage to be a constant value, such as a beginning DAC percentage $P_{set,beg}$. It is noted that the beginning DAC percentage set at 1212 may be the same as the beginning DAC percentage set at 1202, but due to drift, the beginning voltage at 1212 may be different from the beginning voltage at 1202.

At 1214, the voltage of the RF signal 120 is ramped up by controlling the DAC percentage to increase with time, such that the ions of different kinds are ejected from the ion trap 102 and detected by the detector 106 sequentially. After the RF ramp is finished, the DAC percentage may be kept at an end DAC percentage $P_{set,end}$ (and thus the voltage of the RF signal 120 is kept at an end voltage $V_{end'}$, note that the end DAC percentage set at 1214 may be the same as the end DAC percentage set at 1204, but due to drift, the end voltage at 1214 may be different from the end voltage at 1204). In some embodiments, the DAC percentage is controlled to increase linearly with time. The DAC percentage at which a mass peak is detected is recorded as $P_{peak}$ (note there may be multiple mass peaks, depending on the measurement sample).

While the voltage is ramped up, a new correction function may be constructed (according to 606 in FIG. 6), which may be used to reference an actually-set DAC percentage back to a nominal DAC percentage at the reference time $t_{ref}$. Note that, due to drift, the new correction function obtained at 1214 may be different from the correction function obtained at 1204.

At 1216, the DAC percentage $P_{peak}$ is substituted into the new correction function obtained at 1214 to calculate a corresponding nominal DAC percentage $P_{nom,peak}$.

At 1218, the calculated nominal DAC percentage $P_{nom,peak}$ is substituted into the trap model (i.e., equation (8)) to calculate a corresponding ion mass. The calculated ion mass is an uncalibrated ion mass, and is recorded as $M_{un\text{-}cal,peak}$.

At 1220, the uncalibrated ion mass $M_{un\text{-}cal,peak}$ is substituted into the mass calibration function (i.e., equation (9)) to calculate a calibrated mass $M_{cal,peak}$.

In the embodiments described above, the DAC percentage P is used in the calculation. However, the present disclosure is not so limited. For example, absolute value of the setting of the DAC 122 may be used. As another example, any variable that is used to control the output of the RF generator 108, such as the voltage of the RF signal 120, may be used.

Consistent with embodiments of the present disclosure, the calculation, estimation, data processing, etc., discussed above may be performed in the signal processor 112. The signal processor 112 may be any electronic device that is capable of processing signals from the detector 106 and the sampling circuit 110, such as, for example, a personal computer, a workstation, a parallel computer, a super computer, a microcomputer, a microprocessor, or a single-chip microprocessor.

Consistent with embodiments of the present disclosure, one or more computer-readable non-transitory storage medium storing a program are provided. The one or more non-transitory storage medium may be installed in the signal processor 112 or provided separately. The signal processor 112 may read the program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be a semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A mass spectrometer comprising:

an ion trap configured to trap ions and to eject ions, the ion trap comprising an electrode;

a detector configured to detect ions ejected from the ion trap;

a radio frequency (RF) generator electrically coupled to the electrode, the RF generator being configured to generate an RF signal to be applied to the electrode;

a sampling circuit electrically coupled to the electrode, the sampling circuit being configured to sample a voltage of the RF signal applied to the electrode; and a signal processor electrically coupled to the sampling circuit and the detector, the signal processor being configured to receive an output from the detector and an output from the sampling circuit and to correct the output from the detector based on the output from the sampling circuit.

2. The mass spectrometer according to claim 1, wherein the signal processor is further configured to correct the output from the detector by adjusting a mass scale of a mass spectrum obtained using the output from the detector directly.

3. The mass spectrometer according to claim 2, wherein the signal process is further configured to construct a correction function based on the output from the sampling circuit and adjust the output from the detector based on the correction function.

4. The mass spectrometer according to claim 1, wherein the sampling circuit comprises:

a voltage divider electrically coupled to the RF generator;

an amplifier electrically coupled to the voltage divider; and an analog-to-digital converter (ADC) electrically coupled to the amplifier.

5. The mass spectrometer according to claim 4, wherein the ADC has a sampling rate lower than a frequency of the RF signal.

6. The mass spectrometer according to claim 4, wherein:

the voltage divider comprises a first capacitor electrically coupled to the voltage divider and a second capacitor electrically coupled to the first capacitor, and the amplifier is electrically coupled to a point between the first and second capacitors.

7. The mass spectrometer according to claim 4, wherein voltage divider comprises a first resistor electrically coupled to the voltage divider and a second resistor electrically coupled to the first resistor, and wherein the amplifier is electrically coupled to a point between the first and second resistors.

8. A method for adjusting an output of a mass spectrometer, comprising:

generating a radio frequency (RF) signal to be applied to an electrode of an ion trap configured to trap ions;

constructing a reference function describing a relationship at a reference time between a voltage of the RF signal and a parameter controlling the generation of the RF signal;

constructing a correction function based on the reference function, the correction function describing a relationship between set values of the parameter at a time later than the reference time and nominal values of the parameter at the reference time; and adjusting the output of the mass spectrometer based on the correction function.

9. The method according to claim 8, wherein each of the set values of the parameter reflects a value of the parameter that is set to generate the RF signal having a first voltage at the time later than the reference time, and the corresponding nominal value of the parameter reflects a value of the parameter that is capable of generating a second voltage at the reference time that is approximately equal to the first voltage.

10. The method according to claim 8, wherein adjusting the output of the mass spectrometer further includes:

constructing a mass calibration function describing a relationship between values of a calibrated ion mass output and values of an uncalibrated ion mass output, based on the correction function and a trap model, the trap model describing a relationship between the values of the uncalibrated ion mass output and the nominal values of the parameter.

11. The method according to claim 10, wherein constructing the mass calibration function comprises:

trapping calibration ions generated from a calibration sample in the ion trap, the calibration ions having known ion masses;

ramping up the voltage of the RF signal by increasing the parameter;

recording calibration parameter values of the parameter at which calibration mass peaks are detected;

substituting the calibration parameter values into the correction function to calculate corresponding nominal calibration parameter values of the parameter at the reference time;

substituting the nominal calibration parameter values into the trap model to calculate corresponding uncalibrated reference ion mass outputs; and constructing the mass calibration function by performing fitting on mass-calibration-function-fitting control points, each of the mass-calibration-function-fitting control points comprising one of the known ion masses and the corresponding uncalibrated reference ion mass output.

12. The method according to claim 10, wherein adjusting the output of the mass spectrometer further includes:

adjusting an uncalibrated detected ion mass output of a measurement ion based on the mass calibration function.

13. The method according to claim 12, wherein adjusting the uncalibrated detected ion mass output comprises:

trapping measurement ions generated from a measurement sample in the ion trap;

ramping up the voltage of the RF signal by increasing the parameter;

recording a parameter value of the parameter at which a mass peak is detected;

substituting the parameter value into the correction function to calculate a corresponding nominal parameter value of the parameter at the reference time;

substituting the nominal parameter value into the trap model to calculate the uncalibrated detected ion mass output; and substituting the uncalibrated detected ion mass output into the mass calibration function to calculate a calibrated detected ion mass output.

14. The method according to claim 8, wherein constructing the reference function comprises:

measuring a control value of the voltage at each of a plurality of control values of the parameter to obtain reference-function-fitting control points, each of the reference-function-fitting control points comprising one of the control values of the parameter and the corresponding control value of the voltage; and performing a fitting on the reference-function-fitting control points to construct the reference function.

15. The method according to claim 14, wherein performing the fitting on the reference-function-fitting control points includes performing a monotone cubic interpolation on the reference-function-fitting control points.

16. The method according to claim 15, wherein performing the monotone cubic interpolation on the reference-function-fitting control points includes performing the monotone cubic interpolation on the reference-function-fitting control points using a cubic Hermite spline function.

17. The method according to claim 8, wherein constructing the correction function includes constructing a linear correction function.

18. The method according to claim 17, wherein constructing the linear correction function comprises:

measuring a first voltage value of the voltage while keeping the value of the parameter at a first parameter value;

measuring a second voltage value of the voltage while keeping the value of the parameter at a second parameter value;

substituting the first and second voltage values into the reference function to calculate a first nominal parameter value and a second nominal parameter value, to obtain two linear-correction-function-fitting control points, one of the linear-correction-function-fitting control points comprising the first nominal parameter value and the first parameter value, and another one of the linear-correction-function-fitting control points comprising the second nominal parameter value and the second parameter value; and constructing the linear correction function based on the linear-correction-function-fitting control points.

19. The method according to claim 8, wherein constructing the correction function includes constructing a non-linear correction function.

20. The method according to claim 19, wherein constructing the non-linear correction function comprises:

measuring a first voltage value of the voltage while keeping the value of the parameter at a first parameter value;

measuring a second voltage value of the voltage while keeping the value of the parameter at a second parameter value;

substituting the first and second voltage values into the reference function to calculate a first nominal parameter value and a second nominal parameter value;

constructing a linearity compensation function describing a relationship between the set values of the parameter and intermediate values of the parameter, comprising:

measuring a new voltage value of the voltage at each of a plurality of new control parameter values of the parameter;

substituting the new voltage values into the reference function to calculate corresponding intermediate control parameter values of the parameter, to obtain linearity-compensation-function-fitting control points, each of the linearity-compensation-function-fitting control points comprising one of the intermediate control parameter values and the corresponding new control parameter value; and performing a fitting on the linearity-compensation-function-fitting control points to construct the linearity compensation function;

substituting the first and second voltage values into the linearity compensation function to calculate a first intermediate parameter value and a second intermediate parameter value of the parameter;

constructing a linear intermediate correction function using a first and a second linear-intermediate-correction-function-fitting control points, the first linear-intermediate-correction-function-fitting control point comprising the first nominal parameter value and the first intermediate parameter value, and the second linear-intermediate-correction-function-fitting control point comprising the second nominal parameter value and the second intermediate parameter value;

substituting the intermediate control parameter values into the linear intermediate correction function to calculate corresponding nominal control parameter values of the parameter; and constructing the non-linear correction function by performing fitting on non-linear-correction-function-fitting control points, each of the non-linear-correction-function-fitting control points comprising one of the nominal control parameter values and the corresponding new control parameter value.

21. The method according to claim 8, wherein adjusting the output of the mass spectrometer further includes:

constructing a mass-voltage function describing a relationship between values of an ion mass and values of the voltage based on the correction function.

22. The method according to claim 21, wherein constructing the mass-voltage function comprises:

trapping calibration ions generated from a calibration sample in the ion trap, the calibration ions having known ion masses;

ramping up the voltage of the RF signal by increasing the parameter;

recording calibration parameter values of the parameter at which calibration mass peaks are detected;

substituting the calibration parameter values into the correction function to calculate corresponding nominal calibration parameter values of the parameter at the reference time;

substituting the nominal calibration parameter values of the parameter into the reference function to calculate corresponding calibration voltage values of the voltage; and constructing the mass-voltage function by performing a fitting on mass-voltage-function-fitting control points, each of the mass-voltage-function-fitting control points comprising one of the known ion masses and the corresponding calibration voltage value.

23. The method according to claim 21, wherein adjusting the output of the mass spectrometer further includes:

calculating an adjusted ion mass output of a measurement ion based on the mass-voltage function and an estimated voltage of the RF signal corresponding to the measurement ion.

24. The method according to claim 23, wherein calculating the adjusted mass output comprises:

trapping measurement ions generated from a measurement sample in the ion trap;

ramping up the voltage of the RF signal by increasing the parameter;

recording a parameter value of the parameter at which a mass peak is detected;

substituting the parameter value into the correction function to calculate a corresponding nominal parameter value of the parameter at the reference time;

substituting the nominal parameter value into the reference function to calculate the estimated voltage of the RF signal; and substituting the estimated voltage of the RF signal into the mass-voltage function to calculate the adjusted ion mass output.

25. The method according to claim 8, wherein:

the RF signal is output from an RF generator controlled by a digital-to-signal converter (DAC), and the parameter includes a percentage of a maximum output of the DAC.

26. A non-transitory computer-readable medium storing a program, which, when executed by a computer, controls the computer to adjust an output of a mass spectrometer, the program controlling the computer to:

construct a reference function describing a relationship at a reference time between a voltage of a radio frequency (RF) signal and a parameter controlling the generation of the voltage, the RF signal being to be applied to an electrode of an ion trap configured to trap ions;

construct a correction function based on the reference function, the correction function describing a relationship between set values of the parameter at a time later than the reference time and nominal values of the parameter at the reference time; and adjust the output of the mass spectrometer based on the correction function.

* * * * *